United States Patent [19]

Röhm

[11] 4,026,566
[45] May 31, 1977

[54] POWER-DRIVEN WEDGE-ACTIVATED CHUCKS

[76] Inventor: Günter Horst Röhm, Heinrich-Rohm-Str.50, Sontheim, Germany, 7927

[22] Filed: July 12, 1976

[21] Appl. No.: 704,696

[30] Foreign Application Priority Data

July 29, 1975 Germany .......................... 2533803

[52] U.S. Cl. ................................. 279/121; 279/123
[51] Int. Cl.² .................... B23B 31/06; B23B 31/16
[58] Field of Search .......... 279/121, 122, 116, 115, 279/123, 110, 1 A

[56] References Cited

UNITED STATES PATENTS

| | | | |
|---|---|---|---|
| 1,786,147 | 12/1930 | Bullard | 279/121 |
| 2,602,673 | 7/1952 | Deuring et al. | 279/121 X |
| 2,954,983 | 10/1960 | Roby | 279/121 |
| 3,656,773 | 4/1972 | Blattry et al. | 279/110 X |
| 3,682,491 | 8/1972 | Sakazaki et al. | 279/110 X |
| 3,704,022 | 11/1972 | Blattry et al. | 279/110 X |
| 3,814,451 | 6/1974 | Röhm | 279/121 |

*Primary Examiner*—Othell M. Simpson
*Assistant Examiner*—Horace M. Culver
*Attorney, Agent, or Firm*—Karl F. Ross; Herbert Dubno

[57] ABSTRACT

A chuck for lathes and other machine tools has a chuck body provided with axially shiftable wedging members to actuate the jaws, a rotatable guard ring prevents full axial withdrawal of these members from sockets in the jaws in one angular position of the ring. In another angular position of the ring recesses in the latter are aligned with the wedging members to allow the latter to clear the jaws for radial withdrawal and replacement thereof.

7 Claims, 6 Drawing Figures

POWER-DRIVEN WEDGE-ACTIVATED CHUCKS

FIELD OF THE INVENTION

The invention relates to power-driven wedge-actuated chucks with several workpiece-gripping jaws arranged radially in a chuck body and connected by way of wedge sockets mounted at an incline in relation to the chuck axis, and wedge-shaped pieces engaging the latter, to a control member, e.g., a drive sleeve, the drive piston or the like, which is axially slidable in the chuck body for the purpose of actuating the jaws, the wedge-shaped pieces being designed as bolts mounted axially in the chuck body and connected to the control member, so as to be driven in an axial direction.

BACKGROUND OF THE INVENTION

In wedge-actuated collet chucks of this type known to the art, the wedge-shaped pieces engage base gripping jaws laterally by way of helical gears (German Published Application DAS 1 059 741), or are provided with a bolt head formed by wedge surfaces running in parallel, the former engaging the wedge socket on the back side of the base gripping jaw (German Patent DT-PS 2 139 718).

These known wedge-actuated collet chucks have the disadvantage that they do not permit rapid and simple change of the gripping jaws, a particularly desirable feature for numerically controlled machine tools in order to expand the working capacity of such machines by enabling them to accept special gripping jaws.

To eliminate this disadvantage, German Offenlegungsschrift DT-05 2 052 037 has shown a form of construction in which the wedge-shaped pieces and the wedge sockets are designed as wedge hooks engaging each other, whereby the wedge hooks forming the wedge-shaped pieces are attached to a drive piston rotating about the chuck axis, thereby making it possible to disengage the wedge-hook connection from the gripping jaws by rotating the drive piston in order to exchange the gripping jaws. Such chucks are, however, always of a special design which does not lend itself to forming the chuck as a hollow chuck, i.e. with a central passage for executing rod work, or the like.

OBJECT OF THE INVENTION

It is an object of the invention to provide an improved power-driven wedge-actuated chuck in which the gripping jaws can be exchanged speedily and simply, while enabling the chuck to be hollow.

SUMMARY OF THE INVENTION

This object is attained by providing a guard ring, which is mounted torsionally (rotatably about the chuck axis) between two end positions in the chuck body coaxially to the chuck axis, to form a stop for the wedging bolts in one of its end positions, in which the wedge-shaped pieces are locked into the wedge sockets, preventing the wedges from leaving the sockets completely. The ring has a recess for each of the bolts, into which the latter can be retracted in the other end position of the guard ring, until the wedge-shaped pieces have withdrawn completely from the sockets of the jaws.

The bolts are thus always effectively connected with the control member, that is the drive sleeve or the like adjusting them in an axial direction, while the ring is in the end position, in which the wedge-shaped pieces are locked into the wedge sockets. However the guard ring permits axial play of the bolts and the control member as required for performing chucking jobs (clamping and releasing the workpiece), without permitting the wedge-shaped pieces to leave the assigned wedge sockets. In the other end position of the guard ring, this axial play of the control member and the bolt is increased because the bolts may be retracted additionally into the recesses of the guard ring, whereby this additional displacement path is sufficient to permit the wedge-shaped pieces to clear the wedge sockets of the gripping jaws completely, so that the wedge-shaped pieces are freed from the gripping jaws and the latter can be replaced.

The jaws may have workpiece-engaging parts (see my copending application Ser. No. 704,046 filed July 9, 1976 ) which are mounted removably upon jaw base parts. The combination of the two parts or only the latter is termed a base gripping jaw hereinafter.

According to the invention, the guard ring, which is mounted for angular displacement upon the chuck body, has recesses which are alignable in one angular position of the ring with the wedging members to allow full axial withdrawal of the latter by the control ring from the jaw sockets. The jaws can thus be radially withdrawn from the body. In the other angular positions of the ring, the full axial movement of the wedging members is prevented although sufficient axial play is provided to enable normal clamping operation of the jaws by the control ring.

Advantageously, the guard ring is arranged axially behind the bolts, serving thereby as a stop for the rear faces of the bolts. An adjustment pin which can be rotated from outside and is provided with a cam, the latter eccentric in relation to its rotation axis and engaging a radial slot in the guard ring, is preferably mounted in the chuck body in parallel to the chuck axis for torsional adjustment of the guard ring.

Furthermore the chuck is provided with safety stops for the gripping jaws, in order to prevent their being ejected outward in a radial direction in case of damage to the chuck, for instance, if the drive connection between the wedge-shaped pieces and the gripping jaw should become defective through breakage or the like.

In order to exchange the base gripping jaws operationally, I temporarily render the safety stops in the chuck ineffective, when the control member and the bolts constituting the wedge-shaped pieces are in their extreme retracted position and no longer connected with the base gripping jaws.

The invention provides that the safety stops assigned to the base jaws are designed as axially displaceable stop pins, for which the guard ring, when in its end (locking) position with the wedge-shaped pieces locked into the wedge receptors, forms a stop, keeping the stop pins in a forward position ready to engage the jaw projections assigned to them. The guard ring exhibits have respective recesses for the stop pins, into which the stop pins can be driven by spring-action, when the guard ring is in the other (released) end position, until the jaw projections are released. These recesses for the stop pins can be provided with a sloped entrance, over which the stop pins are pushed forward against the spring force to the position securing the base gripping jaws, when the guard ring is returned to its locking end position.

Preferably, I keep the base gripping jaws otherwise in their radial guideways in a rest position after their disengagement from the wedge-shaped pieces thereby preventing the base gripping jaws from falling out of the chuck body by themselves, but without offering major resistance to the removal of the gripping jaws by hand.

To this end I provide in the chuck body axially adjustable detent pins which are pressed by spring-action against assigned detent positions on the base gripping jaws.

Preferably the stop pins are hollow, with the detent pins extending through the hollow stop pins, thus making it possible to pre-assemble the hollow stop pins, the detent pins and the assigned springs as one unit and to introduce them as such assembled into the chuck body. These detent pins may serve the additional purpose of positioning the base gripping jaws during insertion into the chuck body in the position necessary to enable the wedge-shaped pieces to enter the wedge receptors of the jaws assigned to them, if the drive connection between the latter and the wedge-shaped pieces is to be reestablished by sliding the control member forward in an axial direction.

Pursuant to the invention, this positioning can be accomplished in an especially simple manner, by having the detent pins abut with one of their conical surfaces against a shoulder of the base gripping jaw, thus pressing the latter radially inward and causing it to abut under this pressure with one of its jaw projections on the outer surface of the assigned wedge-shaped piece, even though the wedge-shaped piece has left the wedge receptor completely.

The major advance achieved by the invention is the ability to exchange the chuck jaws without requiring for this purpose a control member revolving about the axis, such as a drive sleeve, drive piston, or the like. The chuck pursuant to the invention can therefore be designed easily also as a hollow chuck. Beyond that, its drive requires only the customary, axially operating clamping cylinders which are, e.g., connected with the control member through the hollow machine tool spindle. Swingable drives are unnecessary. Otherwise, safety controls operated by the axial adjustment of the chuck cylinder piston, which is connected to the control member, may be employed. These controls can, e.g., prevent the starting of the machine tool if the control member and, along with it, the bolt are in their end position, i.e. completely retracted from the wedge receptors in the base gripping jaws, and the latter are held only loosely in the radial guideways of the chuck body by the indexing pins.

BRIEF DESCRIPTION OF THE DRAWING

An embodiment of the invention is illustrated in greater detail in the drawing, which shows in FIG. 1 is a wedge-actuated chuck pursuant to the invention in axial section, FIG. 2 the chuck according to FIG. 1 with the base gripping jaws released from the wedge-shaped pieces, FIG. 3 a section view of the chuck according to FIG. 1 along the line III — III thereof, FIG. 4 a sectional view of the chuck according to FIG. 1 along line IV — IV thereof, FIG. 5 a sectional view of the chuck according to FIG. 2 along the line V — V thereof, and FIG. 6 a sectional view of the chuck according to FIG. 2 along the line VI — VI thereof.

SPECIFIC DESCRIPTION

Figure 1:
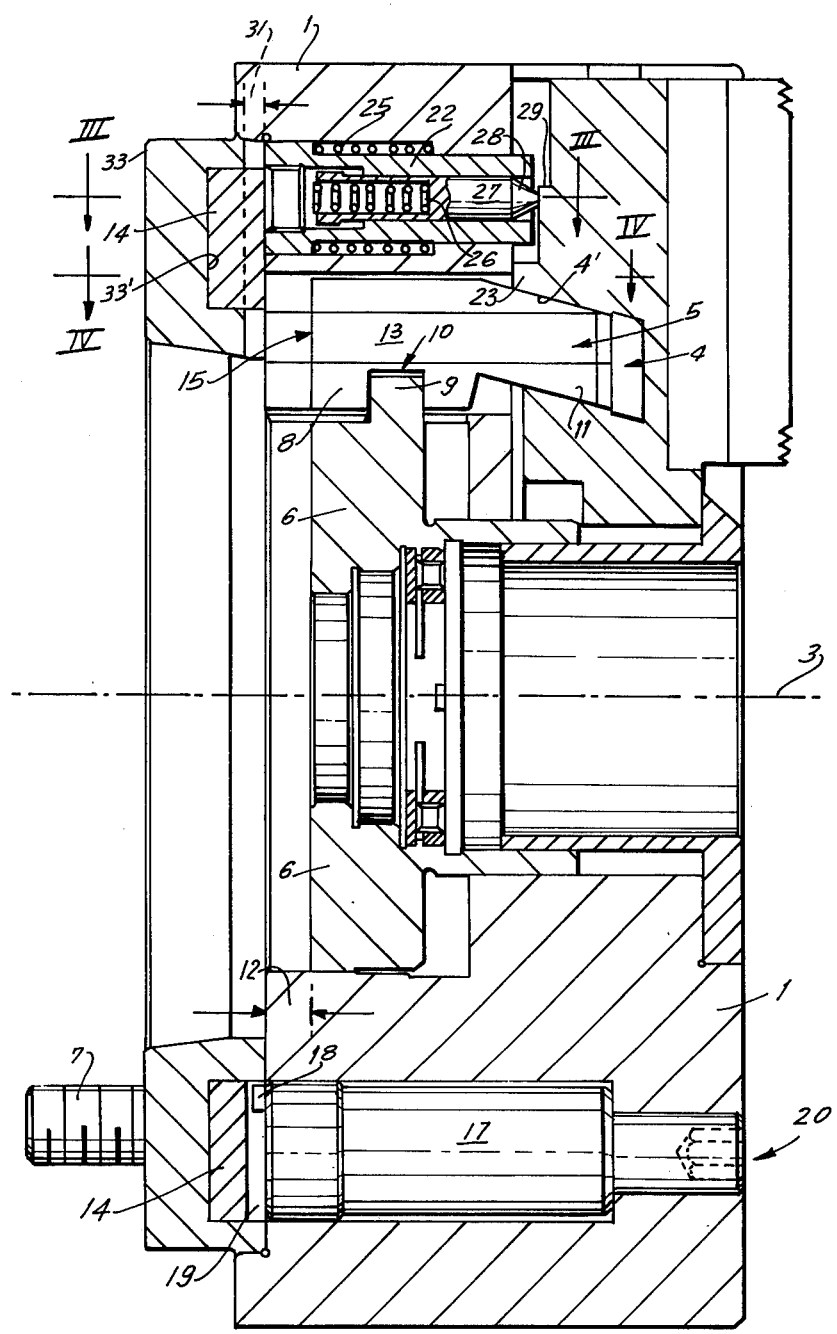
Figure 2:
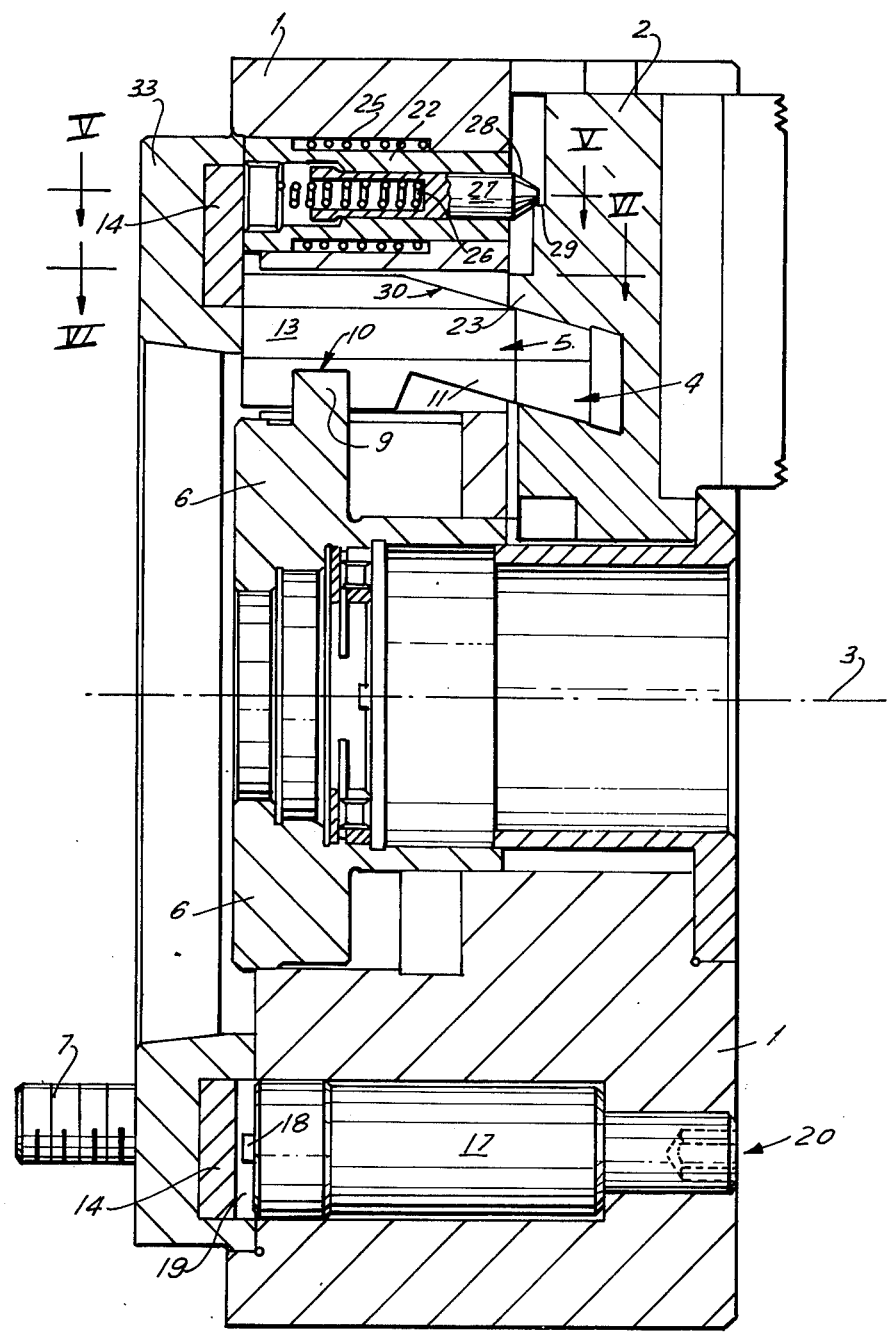

The drawing shows a power-operated wedge-actuated chuck with several base gripping jaws 2 arranged radially in a chuck body 1, of which only one jaw is visible in FIGS. 1 and 2. Faces may be mounted on the base gripping jaws 2 (see the above-mentioned copending application Ser. No. 704,046 filed July 9, 1976 ). The base gripping jaws 2 are connected to a control member 6 by way of wedge sockets 4 which run at an angle to the axis 3, and wedge-shaped pieces 5 engaging the former, whereby the control member 6 shown in the embodiment as a hollow chuck, has been designed as a drive sleeve, while it may, of course, be designed also as a drive piston if a central passage of the chuck is not required.

In order to actuate the base gripping jaws 2, the control member 6 may be shifted axially in the chuck body 1 (compare FIGS. 1 and 2), for which purpose it is connected to a chucking tube or chucking bar not further shown in the drawing, the latter passing through the hollow machine tool spindle, also not shown in the drawing, to which the chuck body 1 is connected by means of fastening screws 7. The chucking tube or chucking bar may be actuated by means of a chuck cylinder piston which is also not shown in the drawing.

The wedge-shaped pieces 5 are designed as bolts 8 with lateral guide rails 13, mounted axially in the chuck body 1 and connected with the control member 6 in order to be driven in an axial direction. To this end the control member 6 engages a respective transverse slot 10 of the bolt 8 by means of one flange component 9 each. The bolts 8 are equipped with a bolt head 11 formed by parallel wedge surfaces, the bolt engaging thereby the wedge socket 4 which is located on the back side of the base gripping jaw 2.

FIG. 1 shows the control member 6 and the bolts 8 in an axially forward position, in which the wedge-shaped pieces 5 project deep into the wedge sockets 4, with the result that the base gripping jaws 2 are shifted radially inward. By axial retraction of the control member 6 the wedge-shaped pieces 5 can be shifted during the axial play defined in FIG. 1 by 12, whereby the wedge-shaped pieces 5 are pulled increasingly from the wedge socket 4, resulting in a radial inward movement of the base gripping jaws 2. However, the wedge-shaped pieces 5 remain inserted in the wedge sockets 4 of the base gripping jaws 2 throughout the entire axial adjustment play.

A guard ring 14 is mounted torsionally (rotatably) between two end positions in the chuck body 1 coaxially with the chuck axis 3, an arrangement accomplished in the embodiment by a ring cover 33 which is attached to the chuck body 1 and has a recess 33' receiving the ring 14.

Figure 3:
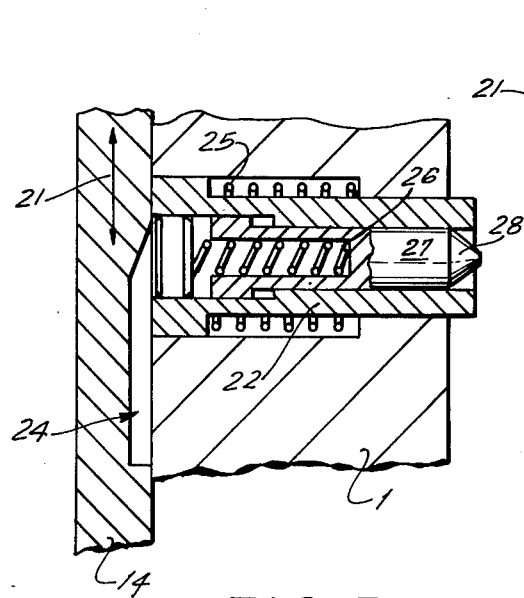
Figure 4:
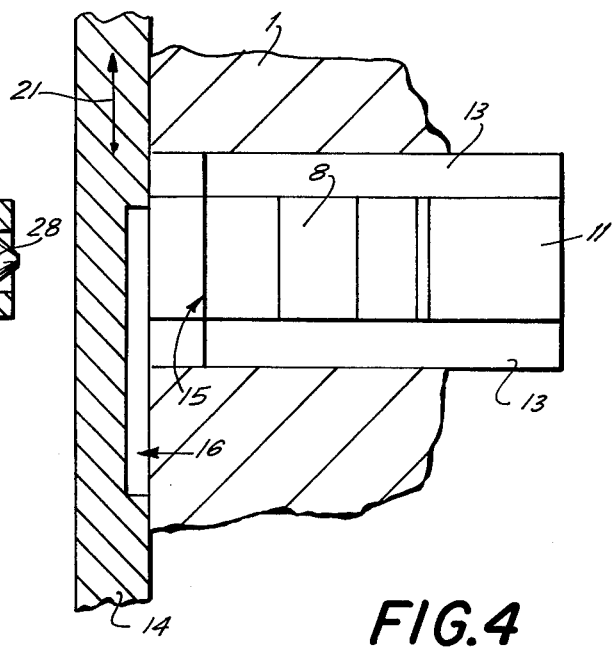

In one of the end positions shown in FIGS. 1, 3 and 4, in which the wedge-shaped pieces 5 are locked in the wedge sockets 4, the guard ring 14 is designed as a stop for the bolts 8, preventing the wedge-shaped pieces 5 from leaving the wedge receptors completely. This is achieved quite simply by arranging the guard ring 14 behind the bolt 8 in an axial direction and by forming a stop for the rear bolt surface 15.

Figure 5:
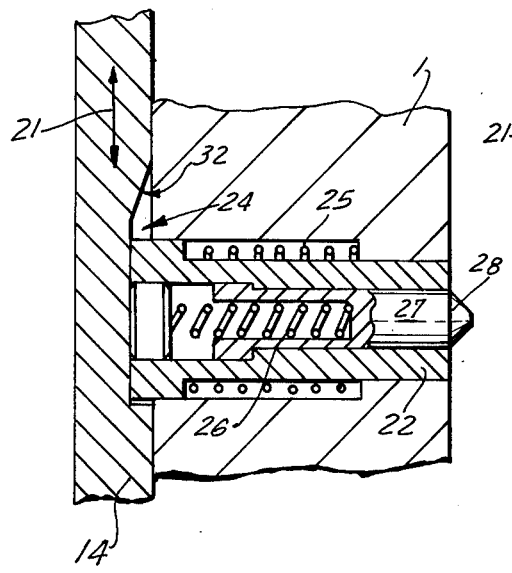
Figure 6:
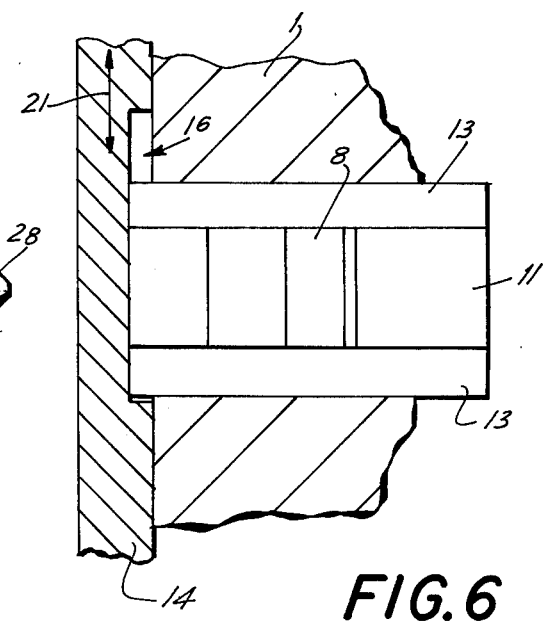

In addition, the guard ring 14 is provided with recesses 16 to accommodate each of the bolts, into which the bolts 8 may retract when the guard ring 14 is in the other end position, as shown in FIGS. 2, 5 and 6, until the wedge-shaped pieces 5 have left the wedge sockets 4 completely.

An adjusting pin 17, positioned in parallel to the chuck axis 3 in the chuck body 1 and provided with a cam 18 which is eccentric in relation to its rotary axis and engages a radial slot 19 in the guard ring 14, serves for torsional adjustment of the guard ring 14. The adjusting pin 17 is provided with a hexagonal key socket 20 which is accessible from the front of the chuck body. By inserting a key into the receptor 20, the adjusting pin may be turned, as a result of which a respective torsional adjustment of the guard ring 14 occurs by way of the eccentric cam 18. This torsional adjustment is indicated in FIG. 3 through 6 by the double arrows 21, depending on the direction of rotation.

In order to prevent radial ejection of the base gripping jaws 2 from the chuck body 1, for instance, in case of fracture of the wedge-shaped pieces 5, safety stops are provided in the form of hollow stop pins 22 which are arranged axially adjustable in the chuck body 1. The guard ring 14 also forms in its end position (FIG. 1), in which the wedge-shaped pieces 5 are locked into the wedge sockets 4, a stop for these stop pins 22, keeping the stop pins 22 in an advanced position ready to engage the jaw projections 23 assigned to them.

Furthermore, the guard ring 14 is fitted with special recesses 24 to accommodate the stop pins 22, into which the latter can be retracted by the action of springs 25 in the other end position of the guard ring 14, as shown in FIG. 2, until the jaw projections 23 are released. Otherwise, axially adjustable rest pins 27 pressed against assigned rest positions on the base gripping jaws 2 by the action of springs 26, are provided in the hollow stop pins 22. These rest pins 27 abut each with a conical surface 28 against a tangential shoulder 29 of the base gripping jaw 2, pressing thereby the base gripping jaw 2 radially inward. The latter abuts under this pressure with the jaw projection 23, which serves simultaneously to secure releasably the base gripping jaw 2 to the stop pin 22, on the radially outer surface of the assigned wedge-shaped piece 5, even through the wedge-shaped piece 5, as shown in FIG. 2, has left the wedge receptor completely.

In the state of the chuck, as shown in FIGS. 1, 3 and 4, the guard ring 14 constitutes a stop preventing the bolts 8 and the stop pins 22 from withdrawing from the wedge sockets 4 completely and from disengaging the base jaw projections completely. The base jaws 2 are therefore form-and friction-locked with the wedge-shaped pieces 5 and are radially adjustable within the scope of axial shift play 12. The base jaws are at the same time secured against being ejected unintentionally from the chuck body 1 by the stop pins 22, against which the jaw projections 23 may come to rest.

If the guard ring 14 is rotated from this end position to the other end position, as shown in FIGS. 5 and 6, the recesses 16 and 24 will be located with their full profile behind the bolt 8 and, the stop pins 22, permitting these components additional retreat by the degree of axial shifting play shown in FIG. 1 by 31, as a result of which the wedge-shaped pieces 5 leave the wedge sockets 4 of the base gripping jaws 2 completely, and the stop pins 22 clear the jaw projections 23. The base gripping jaws 2 are now held only by the detent pins 27. The detent force upon the base gripping jaws 2 may, however, be easily overcome if the base gripping jaws 2 are to be removed from their radial guideways in the chuck body 1. Conversely, the resistance of the detent pins 27 during insertion of the new base gripping jaws can be easily overcome by the camming action of the inclined surface 4', making it possible to introduce the base gripping jaws 2 radially into the chuck body 1, until the jaw projection 23 rests completely on the still fully retracted wedge-shaped piece 5. In this position which permits the wedge-shaped piece 5 to enter the wedge socket 4, the base gripping jaw 2 is held in place by the rest pin 27 abutting the shoulder 29. When the wedge-shaped pieces 5 have been advanced into the wedge sockets 4, the guard ring 14 can be turned back, whereby the stop pins 22 are set back automatically by way of the oblique camming surface 32 of the recesses 24 into their advance position, securing the base gripping jaws 2.

I claim:

1. A power-actuated chuck, comprising:
   a chuck body having an axis;
   a plurality of radially shiftable jaws guided on said body and formed with rearwardly open sockets inclined to said axis;
   respective axially shiftable wedging members on said body having wedging formations receivable in said sockets for radially shifting said jaws upon axial displacement of said wedging members;
   means engaging said members for axially shifting same; and
   a guard ring angularly displaceable on said body about said axis, said guard ring having respective recesses alignable with said members in one angular position of said ring to receive said members and enable full withdrawal of said formations from said sockets.

2. The chuck defined in claim 1 wherein said wedging members are bolts having rearwardly facing ends, said ring being disposed rearwardly of said members to receive said ends in said recesses, said ring forming abutments for said ends in another angular position of the ring whereby such full withdrawal is prevented.

3. The chuck defined in claim 2 wherein said ring is formed with a radial groove, said chuck further comprising an axially extending rotatable pin in said body formed with an eccentric cam received in said groove for shifting said ring between said angular positions.

4. The chuck defined in claim 2, further comprising:
   a respective axially shiftable pin received in said body and engageable with a projection on each of said jaws in an advanced position of the pin to prevent radial removal of the jaw,
   said ring forming abutments for said pins retaining them in said advanced positions in the first-mentioned angular position of said ring and with recesses aligned with said pins in the second angular position of said ring into which said pins can be retracted to clear said projections; and
   respective springs biasing said pins toward said ring.

5. The chuck defined in claim 4, further comprising respective spring-biased detents bearing on said jaws for releasably retaining same on said body upon retraction of said pins.

6. The chuck defined in claim 5 wherein said pins are hollow and receive the respective detents.

7. The chuck defined in claim 5 wherein said detents have conical tips engaging said jaws and positioning same to enable said sockets to receive the respective formations.

* * * * *